(12) United States Patent
Crompton et al.

(10) Patent No.: US 9,879,810 B2
(45) Date of Patent: Jan. 30, 2018

(54) PUSH-TO-CONNECT JOINT ASSEMBLY WITH PROTECTIVE SHIELD DEVICE AND METHOD

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 14/857,911

(22) Filed: Sep. 18, 2015

(65) Prior Publication Data

US 2017/0082231 A1   Mar. 23, 2017

(51) Int. Cl.
| | |
|---|---|
| *F16L 58/18* | (2006.01) |
| *F16L 37/26* | (2006.01) |
| *F16L 25/00* | (2006.01) |
| *F16L 37/091* | (2006.01) |

(52) U.S. Cl.
CPC .......... *F16L 37/26* (2013.01); *F16L 25/0018* (2013.01); *F16L 37/0915* (2016.05); *F16L 58/18* (2013.01)

(58) Field of Classification Search
CPC ... F16L 37/091; F16L 37/092; F16L 37/0925; F16L 37/26; F16L 37/0915; F16L 25/0018; F16L 58/18
See application file for complete search history.

(56) References Cited

U.S. PATENT DOCUMENTS

| | | |
|---|---|---|
| 1,822,056 A | 9/1931 | Noble |
| 2,132,636 A | 10/1938 | Moohs |
| 2,201,372 A | 5/1940 | Miller |
| 2,230,098 A | 1/1941 | Wurzburger |
| 2,450,527 A | 10/1948 | Bohn |
| 2,456,203 A | 12/1948 | Loepsinger |
| 2,529,821 A | 11/1950 | Snider |
| 2,774,616 A | 12/1956 | Dodd et al. |
| 2,917,075 A | 12/1959 | Terry |
| 3,060,959 A | 10/1962 | Clark |
| 3,064,983 A | 11/1962 | Halterman |
| 3,066,961 A | 12/1962 | Gerin |
| 3,140,107 A | 7/1964 | Hynes |
| 3,145,730 A | 8/1964 | Presnell |
| 3,365,219 A | 1/1968 | Nicolaus |
| 3,428,337 A | 2/1969 | Read |

(Continued)

FOREIGN PATENT DOCUMENTS

| | | | |
|---|---|---|---|
| CN | 104154363 A | * | 11/2014 |
| DE | 4304241 | | 8/1994 |

(Continued)

OTHER PUBLICATIONS

Cash ACME, Sharebite(R) Push Fittings: A Connection System for Copper, CPVC or PEX pipe, Dec. 6, 2006. U.S.

*Primary Examiner* — David E Bochna
*Assistant Examiner* — James A Linford
(74) *Attorney, Agent, or Firm* — Williams Mullen, PC; Thomas F. Bergert

(57) ABSTRACT

Embodiments of a push fitting joint packaging arrangement include a sealing member, a fastening ring, a retaining ring member and a shield member. In various embodiments, the shield member has a substantially cylindrical interior surface, and a non-cylindrical exterior surface.

10 Claims, 9 Drawing Sheets

(56) References Cited

U.S. PATENT DOCUMENTS

| | | |
|---|---|---|
| 3,434,745 A | 3/1969 | Jackman |
| 3,679,241 A | 7/1972 | Hoffmann |
| 3,709,526 A | 1/1973 | Cromie |
| 3,805,824 A | 4/1974 | Robbins |
| 3,821,670 A | 6/1974 | Thompson |
| 3,837,687 A | 9/1974 | Leonard |
| 3,885,821 A | 5/1975 | Philibert |
| 3,915,480 A | 10/1975 | Kish et al. |
| 4,009,592 A | 3/1977 | Boerger |
| 4,067,361 A | 1/1978 | Hollister et al. |
| 4,083,586 A | 4/1978 | Helm |
| 4,123,090 A | 10/1978 | Kotsakis et al. |
| 4,146,254 A | 3/1979 | Turner et al. |
| 4,178,023 A | 11/1979 | Guest |
| 4,220,361 A | 9/1980 | Brandenberg |
| 4,275,909 A | 6/1981 | Yoshizawa et al. |
| 4,288,113 A | 9/1981 | Saulnier |
| 4,305,606 A | 12/1981 | Legris |
| 4,383,552 A | 5/1983 | Baker |
| 4,437,493 A | 3/1984 | Okuda et al. |
| 4,440,424 A | 4/1984 | Mode |
| 4,466,640 A | 8/1984 | Van Houtte |
| 4,480,729 A | 11/1984 | Porter |
| 4,508,369 A | 4/1985 | Mode |
| 4,593,943 A | 6/1986 | Hama et al. |
| 4,613,172 A | 9/1986 | Schattmaier |
| 4,630,848 A | 12/1986 | Twist et al. |
| 4,637,636 A | 1/1987 | Guest |
| 4,637,640 A | 1/1987 | Fournier et al. |
| 4,645,246 A | 2/1987 | Guest |
| 4,685,706 A | 8/1987 | Kowal et al. |
| 4,712,810 A | 12/1987 | Pozzi |
| 4,747,626 A | 5/1988 | Hama et al. |
| 4,802,696 A | 2/1989 | Chohan et al. |
| 4,867,198 A | 9/1989 | Faust |
| 4,878,697 A | 11/1989 | Henry |
| 4,880,260 A | 11/1989 | Gotoh et al. |
| 4,895,395 A | 1/1990 | Ceriani |
| 4,919,457 A | 4/1990 | Moretti |
| 5,010,740 A | 4/1991 | Backus et al. |
| 5,024,468 A | 6/1991 | Burge |
| 5,084,954 A | 2/1992 | Klinger |
| 5,108,134 A | 4/1992 | Irwin |
| 5,160,179 A | 11/1992 | Takagi |
| 5,181,751 A | 1/1993 | Kitamura |
| 5,230,539 A | 7/1993 | Olson |
| 5,251,655 A | 10/1993 | Low |
| 5,284,582 A | 2/1994 | Yang |
| 5,292,157 A | 3/1994 | Rubichon |
| 5,370,423 A | 12/1994 | Guest |
| 5,425,347 A | 6/1995 | Zinke, III |
| 5,443,289 A | 8/1995 | Guest |
| 5,487,572 A | 1/1996 | Combot-Courrau et al. |
| 5,524,936 A | 6/1996 | Barr et al. |
| 5,577,530 A | 11/1996 | Condon |
| 5,603,532 A | 2/1997 | Guest |
| 5,711,550 A | 1/1998 | Brandt |
| 5,722,696 A | 3/1998 | Taneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 5,996,632 A | 12/1999 | Vogel et al. |
| 6,012,743 A | 1/2000 | Godeau et al. |
| 6,145,887 A | 11/2000 | Combot-Courrau |
| 6,174,002 B1 | 1/2001 | Rho |
| 6,343,814 B1 | 2/2002 | Bucher et al. |
| 6,357,802 B1 | 3/2002 | Nozato et al. |
| 6,447,019 B1 | 9/2002 | Hosono et al. |
| 6,517,124 B1 | 2/2003 | Le Quere |
| 6,536,470 B1 | 3/2003 | Carn et al. |
| 6,578,879 B2 | 6/2003 | Muto |
| 6,612,623 B2 | 9/2003 | Salomon-Bahls |
| 6,685,230 B1 | 2/2004 | Bottura |
| 6,764,102 B2 | 7/2004 | Ezura |
| 6,805,385 B2 | 10/2004 | Viegener |
| 6,824,172 B1 | 11/2004 | Komolrochanaporn |
| 6,843,516 B2 | 1/2005 | Bishop et al. |
| 6,869,109 B2 | 3/2005 | Matsushita |
| 6,871,804 B2 | 3/2005 | Hagihara |
| 6,979,026 B2 | 12/2005 | Kasahara et al. |
| 6,988,509 B2 | 1/2006 | Frampton |
| 7,100,948 B2 | 9/2006 | Guest |
| 7,178,836 B2 | 2/2007 | Hoff et al. |
| 7,195,287 B2 | 3/2007 | Wai |
| 7,273,235 B2 | 9/2007 | Coquard et al. |
| 7,316,429 B2 | 1/2008 | Viegener |
| 7,380,836 B2 | 6/2008 | Bogdanowicz et al. |
| 7,445,247 B2 | 11/2008 | Ericksen et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,621,569 B2 | 11/2009 | Anthoine |
| 7,644,955 B1 | 1/2010 | Komolrochanaporn |
| 7,686,346 B1 | 3/2010 | Buccicone et al. |
| 7,823,932 B2 | 11/2010 | Webb et al. |
| 7,850,208 B2 | 12/2010 | Greenberger |
| 7,862,089 B2 | 1/2011 | Crompton |
| 7,914,050 B2 | 3/2011 | Udhofer et al. |
| 7,942,161 B2 | 5/2011 | Crompton |
| 7,954,861 B2 | 6/2011 | Swift et al. |
| 8,118,331 B2 | 2/2012 | Yamashita et al. |
| 8,205,915 B1 | 6/2012 | Crompton et al. |
| 8,210,576 B2 | 7/2012 | Crompton |
| 8,322,755 B2 | 12/2012 | Kluss et al. |
| 8,398,122 B2 | 3/2013 | Crompton et al. |
| 8,439,404 B2 | 5/2013 | Anton et al. |
| 8,480,134 B2 | 7/2013 | Crompton et al. |
| 8,491,012 B2 | 7/2013 | LeQuere |
| 8,517,431 B2 | 8/2013 | Arning et al. |
| 8,585,100 B2 | 11/2013 | Stults et al. |
| 9,068,680 B1 * | 6/2015 | Crompton ............. F16L 37/091 |
| 9,671,049 B1 * | 6/2017 | Crompton ........... F16L 37/0915 |
| 2003/0057701 A1 | 3/2003 | Koo |
| 2004/0070198 A1 | 4/2004 | Rohrig |
| 2004/0245766 A1 | 12/2004 | Vallee |
| 2006/0202478 A1 | 9/2006 | Guest |
| 2006/0214422 A1 * | 9/2006 | Cuvo ................... F16L 37/091 285/340 |
| 2007/0075542 A1 | 4/2007 | Glaze et al. |
| 2009/0021001 A1 * | 1/2009 | Oh ........................ F16L 19/086 285/80 |
| 2010/0194104 A1 * | 8/2010 | Hennemann ........ F16L 37/0842 285/330 |
| 2010/0253064 A1 | 10/2010 | LeQuere |
| 2011/0101685 A1 | 5/2011 | Lai |
| 2012/0273709 A1 | 11/2012 | Zhang |

FOREIGN PATENT DOCUMENTS

| | | | |
|---|---|---|---|
| DE | 202012102342 U1 * | 10/2013 | ............ F16L 37/091 |
| EP | 0272988 | 6/1988 | |
| EP | 1521027 | 4/2005 | |
| EP | 2256394 | 12/2010 | |
| EP | 2366933 A1 * | 9/2011 | ............ F16L 37/091 |
| FR | 2876613 A1 * | 4/2006 | ............ B25B 27/20 |
| GB | 2146400 | 4/1985 | |
| GB | 2328259 | 2/1999 | |
| JP | 4040490 B * | 7/1992 | |
| JP | 2001032984 | 2/2001 | |
| JP | 3961489 B2 * | 8/2007 | .......... F16L 37/0925 |
| WO | 1999039124 | 8/1999 | |
| WO | 0079173 | 12/2000 | |
| WO | WO 2013056273 A2 * | 4/2013 | ............ F16L 37/091 |

* cited by examiner

PUSH-TO-CONNECT JOINT ASSEMBLY WITH PROTECTIVE SHIELD DEVICE AND METHOD

TECHNICAL FIELD

The present invention relates to fluid flow systems, and more particularly to a push-fit joint assembly, device and method that facilitates the simple connection, disconnection, repair and re-use of piping and tubing system parts without coining or threaded end caps.

BACKGROUND

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™ CopperHead® and Push Connect® lines of push fittings and related products. Also, such technology is described, for example, in U.S. Pat. Nos. 7,862,089, 7,942,161, 8,205,915, 8,210,576, 8,398,122, 8,480,134, 8,844,974 and 8,844,981, the disclosures of which are incorporated herein by reference in their entireties.

In past pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-to-connect fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, past efforts have been specifically provided for the connection of like materials and lack the ability to connect two unlike materials, such as copper with CPVC, PEX or stainless steel, or any other combination of unlike materials. Past methods further invariably require the replacement of fittings and valves, and do not allow re-use of the fittings or valves in instances where only a small internal component needs to be repaired or replaced. Further, past products and methods do not provide enhanced protective retainers among various packing components such that, in the event of degrading or catastrophic failure of internal parts, such parts would be precluded from separating or moving out of the fitting.

SUMMARY

The present invention provides, in part, a push fitting assembly package that facilitates the re-use of push fittings without damage to the fitting elements or the pipe. The present invention connects piping using no tools, clamps, solder or glues, while creating a leak-free seal at the connected joining area. Further, the present invention can join both like and unlike piping elements without coining or threading the elements into place. The present invention also provides a protective retainer on various packing components such that, in the event of degrading or catastrophic failure of internal parts, such parts would be precluded from separating. As described, various embodiments of the present invention can withstand up to 3600 pounds of pressure or more, and are thus employable within a heating, ventilation and air-conditioning (HVAC) environment.

The quick connection pipe joint assembly package provided as part of the present invention employs a release pusher member that, when removed, exposes the clamping, sealing and fastening mechanisms of the fitting. The release pusher member, also called the "release pusher" moves axially and can push the fastening ring of the present invention in order to facilitate the release of a cylindrical object such as a piping element held within the fitting.

For purposes of the present disclosure, a fitting (also referred to as a body member) can encompass a valve member and other piping elements including, but not limited to: a coupling joint, an elbow joint, a tee joint, a stop end, a ball valve member, tubing and other objects having cylindrical openings. In one embodiment of the present invention, one or more sealing member gasket inserts (e.g., O-ring members) fits within a first sealing ring compartment defined in the interior wall of the fitting. In addition, a fastening ring support compartment is machined into the interior wall to retain at least a portion of the body of the fastening ring. The interior housing elements provide integrated support for the sealing member(s) and fastening ring when opposing force is applied to piping elements that have been inserted into the fitting. In various embodiments, a retaining ring and shield member are employed within a retaining ring support compartment machined into the interior wall of the fitting to provide additional support for the fastening ring and to cooperate with the release pusher to facilitate connection and disconnection of piping elements.

Various embodiments of the present invention provide a novel push fitting joint packing arrangement comprising a sealing ring member, a fastening ring, a fastening ring support member, a shield member, a retaining ring member and a release pusher member. The shield member provided as part of the present invention can be configured so as to be slidable into the fitting and snapped into place during installation prior to the retaining ring member. The shield member can be provided with flat or substantially flat sides to drop into position at an angle other than perpendicular to the central axis of the fitting. No coining is necessary in order to insert the shield member.

The release pusher provided as part of the present invention is employed to facilitate the release of tubing, piping and other cylindrical objects inserted into a fitting. The release pusher is manually pushed into the cavity formed by the tube support member within the fitting body and tapered edges of the release pusher generally or nearly abut the installed fastening ring. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed.

DETAILED DESCRIPTION OF THE PREFERRED EMBODIMENTS

Figure 1:
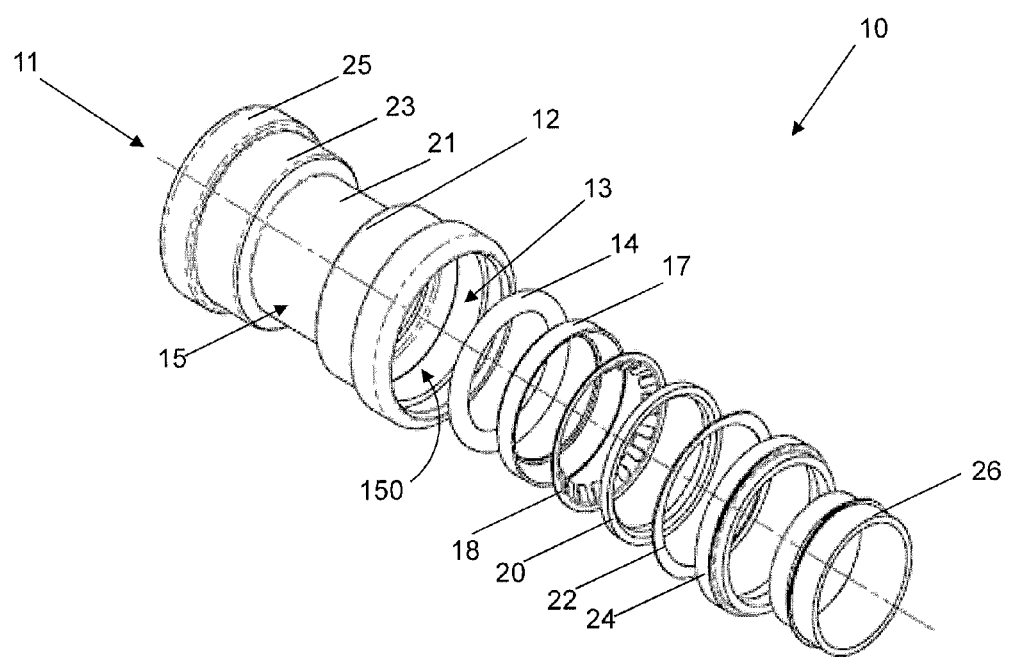
FIG. 1 is an exploded front perspective view of one embodiment of a piping joint assembly package in accordance with the present invention.
Figure 2:
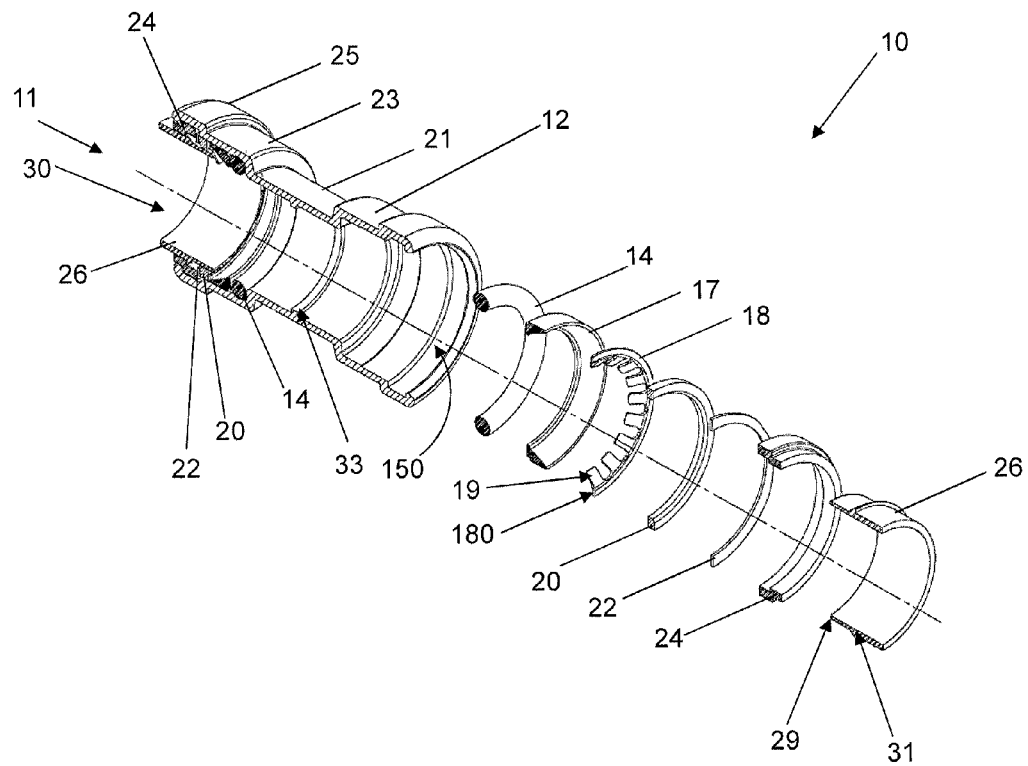
FIG. 2 is a partially exploded front perspective cross-sectional view of the piping joint assembly package of FIG. 1.

In the push-fit piping joint assembly 10 of one embodiment of the present invention as shown in FIGS. 1 and 2, elements of the joint assembly as shown include: a fitting (i.e., fitting body member) 12 having an inner wall 13 and an outer wall 15. The inner wall 13 forms a cavity 150 extending along a central axis 11 that extends axially through the fitting. The respective diameters of the inner wall 13 and outer wall 15 as measured from the central axis 11 increase from an axially inner segment 21 of the fitting to the axial mid-segment 23 of the fitting, and from the axial mid-segment 23 of the fitting to the axially outer segment 25 of the fitting.

Figure 6:
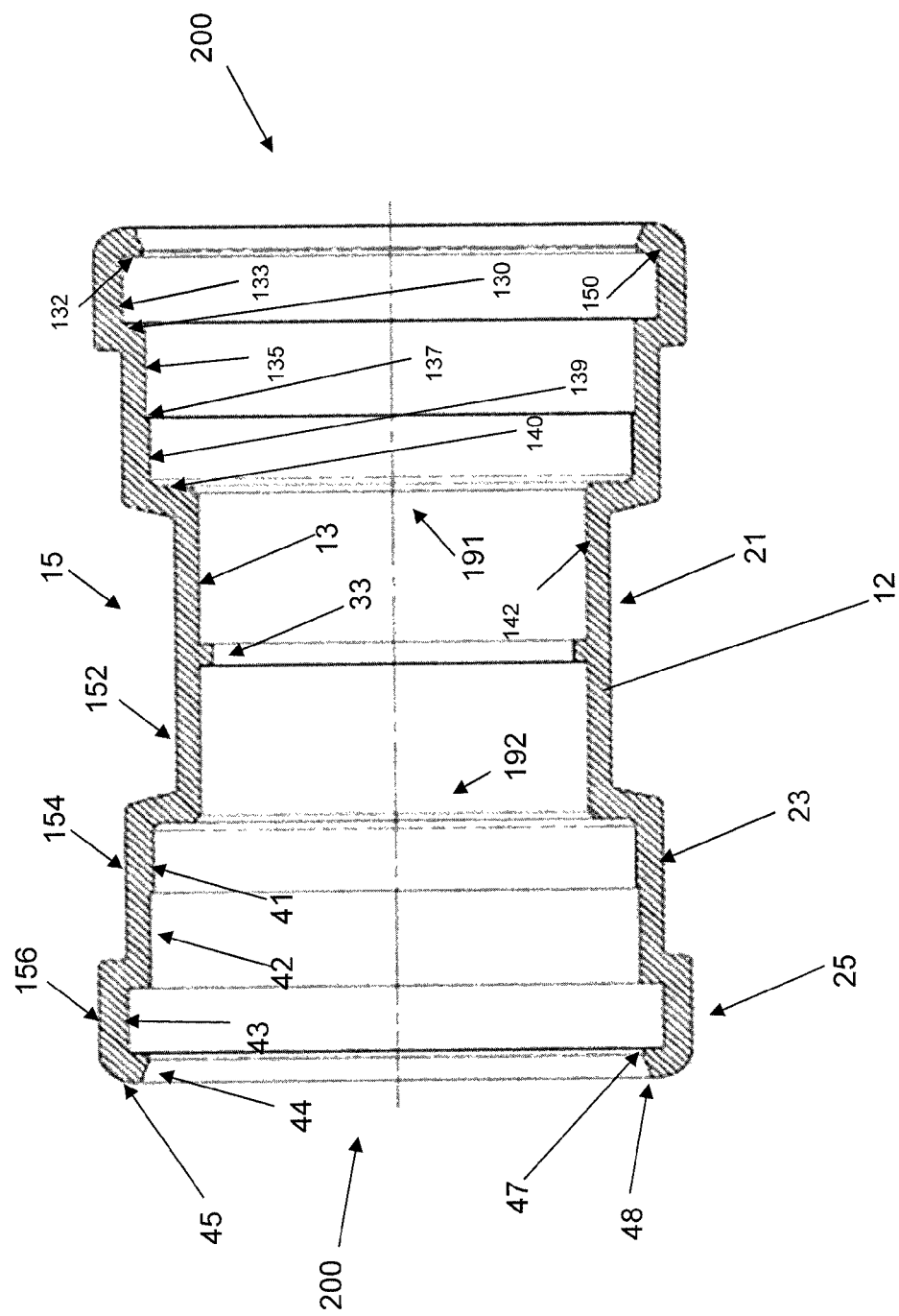
FIG. 6 is a cross-sectional view of one embodiment of the fitting of the present invention.
Figure 7:
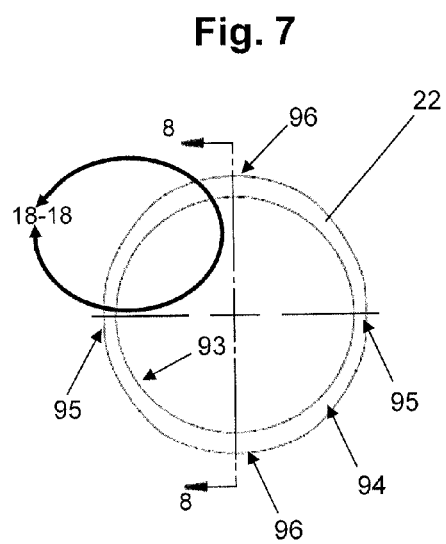
FIG. 7 is a front view of one embodiment of a shield member of the present invention.
Figure 8:
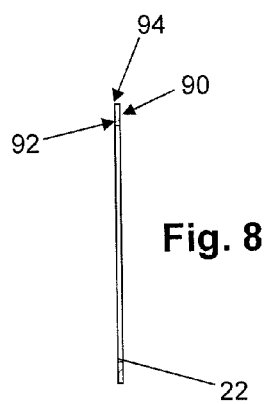
FIG. 8 is a side view of the shield member taken along line 8-8 of FIG. 7.

As shown in FIG. 6, the fitting 12 includes a first interior wall portion 191 separated from a second interior wall portion 192 by tube stop 33. At least the first interior wall portion 191 is formed so as to include a sealing ring compartment 41, a fastening ring compartment 42 and a retaining ring compartment 43. In various embodiments of the present invention, the compartments 41, 42 and 43, as well as tube stop 33, are formed as part of the inner surface of the fitting 12 through hydroforming or similar methods. In this way, internal compartments within the fitting 12 are sized so as to receive packing arrangement elements as described herein, and the fitting with compartments and tube stop comprises a monolithic, integrated structure.

In various embodiments of the present invention, as shown in FIG. 6, retaining ring compartment 43 comprises a front wall portion 130, a back wall portion 132 and a first linear segment 133 of the inner wall 13. The back wall portion 132 can have an interior face 150, a radially inner wall 44 and an exterior face 45. In various embodiments, the radially inner wall 44 is not parallel with the axis 11, but rather extends radially outwardly from an axially inner edge 47 to an axially outer edge 48. In this way, packing arrangement components to be inserted into the fitting need not be perfectly and/or perpendicularly aligned with the radially inner wall 44, but rather can meet the back wall portion 132 at different angles while still being manipulable into the fitting opening. The radially inner wall 44 thus facilitates ease of insertion and removal of packing arrangement components without coining As further shown in FIG. 6, fastening ring compartment 42 can comprise a second linear segment 135 extending from the front wall portion 130 of retaining ring compartment 43 to a riser segment 137 of the inner wall 13, and sealing ring compartment 41 can comprise a third linear segment 139 extending from the riser segment 137 to a sealing ring stop wall 140 of the inner wall 13. The inner wall 13 of the fitting 12 can also include an axially inner segment 142 extending from the sealing ring stop wall 140 to the tube stop 33. In various embodiments of the invention, the compartments 41, 42 and 43 and the elements comprising the compartments can be provided in both the first 191 and the second 192 interior wall portions of the fitting 12, and can be substantially mirror images of one another. As further shown in FIG. 6, the axially inner segment 21 of the fitting 12 encompasses the axially inner segment 142 of the inner wall 13, the axial mid-segment 23 of the fitting 12 encompasses the sealing ring compartment 41 and the fastening ring compartment 42, and the axially outer segment 25 of the fitting 12 encompasses the retaining ring compartment 43. In various embodiments, as shown in FIG. 6, the fitting external wall 15 has an axially internal portion 152, an axial mid-portion 154 and an axially outer portion 156. The axially internal portion 152 has a first radial distance from the axis 11, the axial mid-portion 154 has a second radial distance from the axis 11, and the axially outer portion 156 has a third radial distance from the axis 11, wherein the third radial distance is larger than either of the first and second radial distances, and the second radial distance is larger than the first radial distance. In this way, the fitting 12 maintains a profile and structure that permits it to house the elements of the packing arrangement as described herein, while retaining significant strength to withstand up to 3600 pounds of pressure or more.

In various embodiments, a packing arrangement of the present invention can comprise one or more of: at least one sealing ring member 14 (which can be optionally lubricated), a sealing ring support member 17, a fastening ring 18, a fastening ring support member 20, a shield member 22, a retaining ring member 24 and a release pusher 26. In various embodiments, the fastening ring 18, sealing member 14, sealing ring support member 17 and release pusher 26 each have an internal diameter that allows for smooth and snug engagement of a piping or tubing element external surface (not shown), whereas the shield member 22 and retaining ring member 24 do not contact any piping or tubing element inserted into or removed from the fitting. Further, the release pusher 24 does not contact fitting inner wall 13 during operation. The fitting 12 is substantially hollow, in the sense that the inner wall 13 defines a pipe receiving opening 30 extending axially therethrough.

Figure 3:
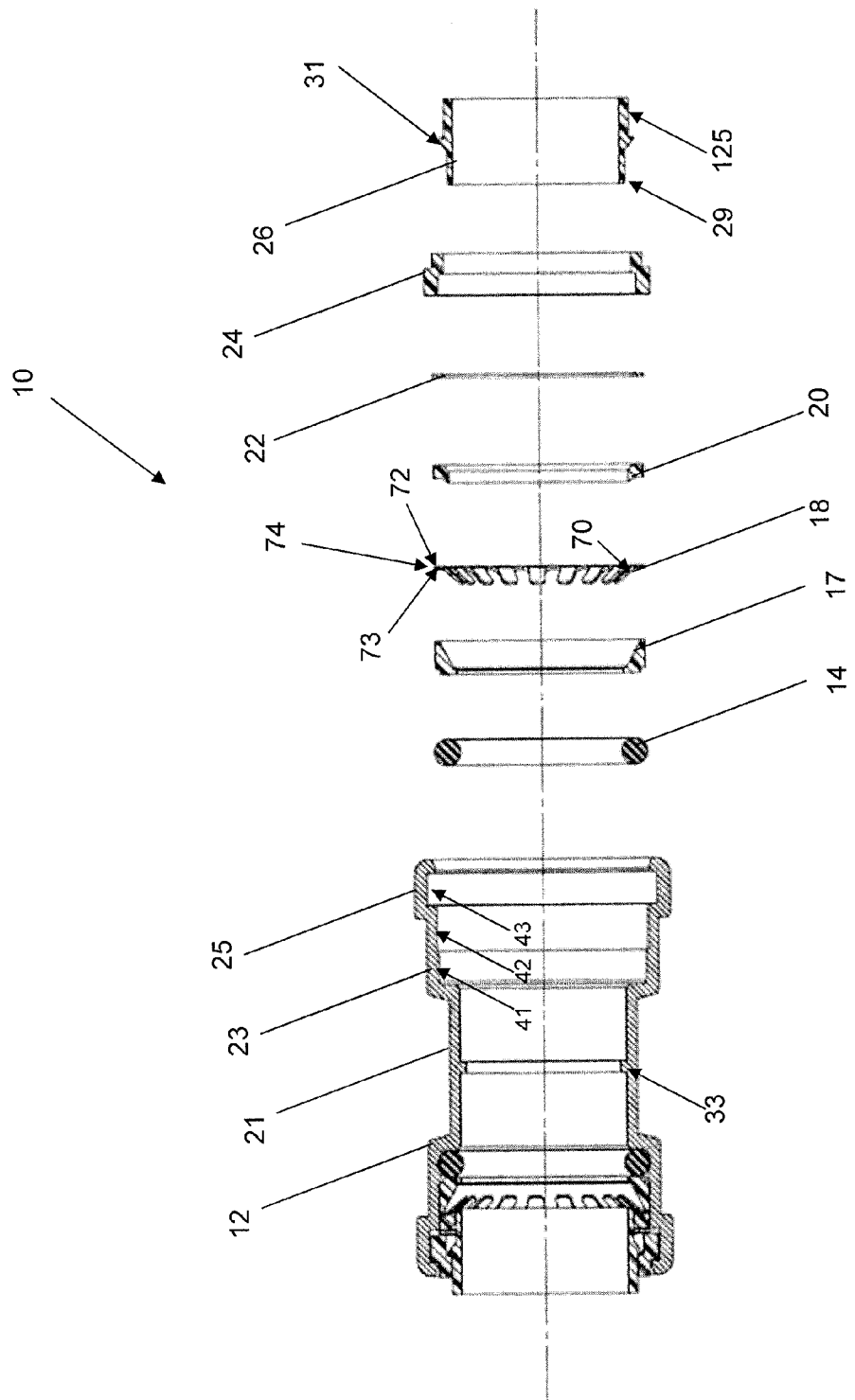
FIG. 3 is a front view of the piping joint assembly package of FIG. 2.
Figure 4:
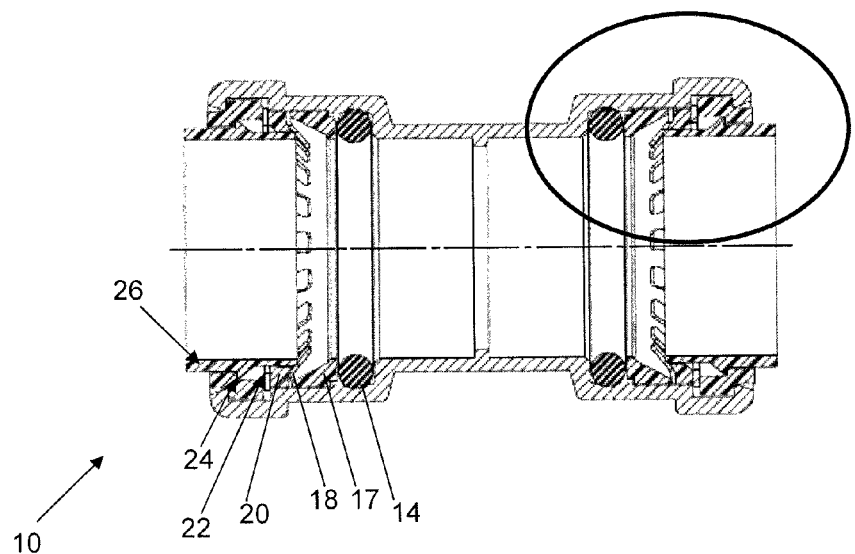
FIG. 4 is a front cross-sectional view of the piping joint assembly package as installed in a pipe fitting in accordance with embodiments of the present invention.

In one embodiment, the fitting 12 can be forged CW617N brass, with full porting and full flow fitting, for example. As shown in FIGS. 2 and 3, for example, the inner wall 13 of the fitting 12 includes an internal stop 33 extending radially inwardly from the inner wall 13 so as to provide a circumferential resistance to tubes inserted on either side of the fitting. The lubricant for the one or more sealing members 14 can be a food grade lubricant, for example. It will be appreciated that the sealing members can comprise a flat ring or washer-type seal member in addition or as an alternative to a circular member of substantially circular cross-section. The fastening ring 18 can comprise a spring steel formulation, for example, that enables the fastening ring to be malformed during installation, while springing back into its originally manufactured position once installed. The fastening ring is capable of grabbing an inserted pipe's surface via two or more teeth 19 to ensure connections cannot be pulled apart. The fastening ring teeth 19 are angled downward from the substantially cylindrical perimeter or base 70 of the ring, toward the tube stop 33 and away from the retaining ring compartment 43, such that when the pipe is inserted, the teeth exert a pressure against the pipe to discourage the pipe from slipping or moving back out of the fitting. No wrenches, solder, welding, glue and/or twisting and turning the elements are required to form a connection. Specifically, the combination of the sealing ring 14, fastening ring 18, shield member 22 and retaining ring member 24 provide a push-fit piping assembly when inserted into any cylindrical pipe in accordance with various embodiments of the present invention.

Figure 5:
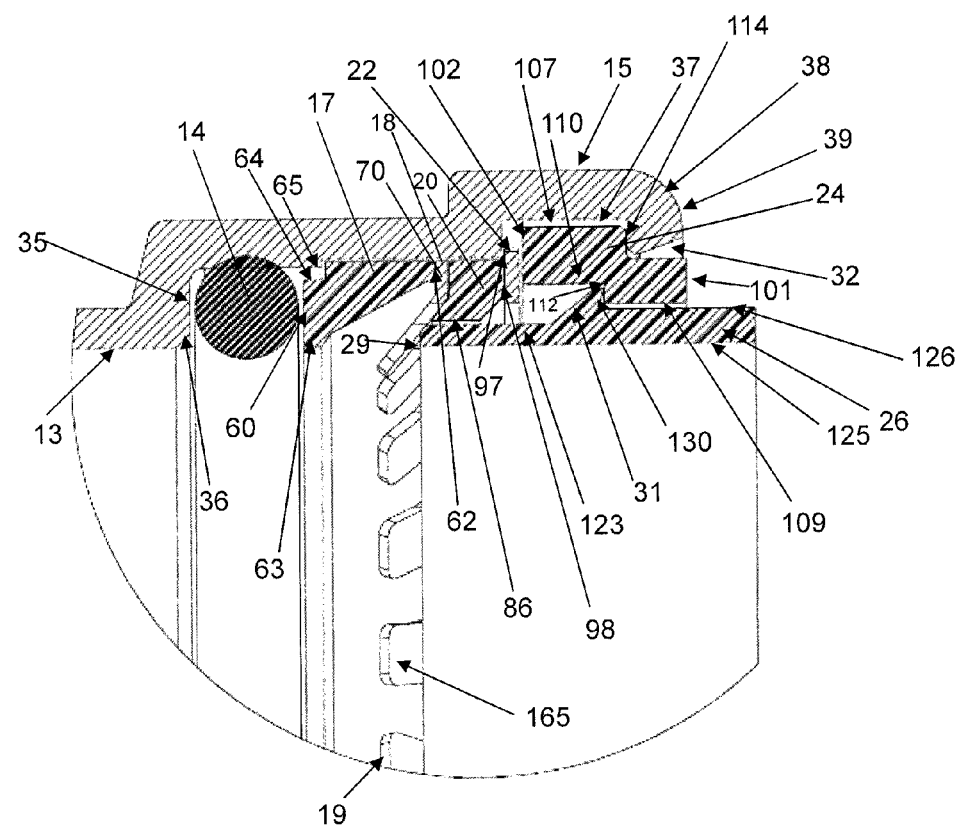
FIG. 5 is a detailed cross-sectional view of encircled portion 5-5 of FIG. 4.

In various embodiments, one or more sealing members 14 is of sufficient size to firmly fit within the sealing ring compartment 41 and against third linear wall 139 of the inner wall 13 of the fitting. Fastening ring 18 includes a base portion 70 and a plurality of bifurcated or square edged teeth 19 extending inwardly from and along the base 70, wherein the base portion 70 is of sufficient diameter to firmly fit within the fastening ring compartment 42 and against second linear segment 135 of the inner wall 13 when the device is assembled. In various embodiments, sealing ring support member 17 includes an axially inner wall 60 and an axially outer wall 62, wherein the sealing ring support member 17 is positioned at least partially within the sealing ring compartment 41 and at least partially within the fastening ring support compartment 42, and further wherein the sealing ring support member axially inner wall 60 is adapted to be in mating contact with the sealing ring 14. As shown in FIG. 5, the axially inner wall 60 can be formed with an axially extending rampart base 64 and a rampart wall 65 extending radially outwardly of the rampart base 64. The rampart base 64 can engage the third linear segment 139 of the inner wall 13 and rampart wall 65 can engage the riser segment 137 of the inner wall 13 to provide stable support for the axial pressures received by the support member 17 during operation. The radially interior edge 63 of the sealing ring support member 17 can engage an inserted pipe during operation, and assists in guiding a pipe over the sealing ring 14 for proper alignment. The radially inner wall 69 of support member 17 is angled so as to permit flexing of the fastening ring teeth 19 to a limited degree as the release pusher moves the teeth 19 axially inwardly during operation to facilitate insertion or removal of a piping element.

As shown in FIGS. 3 and 5, the base portion 70 of the fastening ring 18 has a front wall 72, a rear wall 73 and a radially outer edge 74. In various embodiments, the base portion 70 is positioned within the fastening ring support compartment 42 such that the outer edge 74 engages the second linear segment 135, and such that the front wall 72 is in mating contact with the axially outer wall 62 of the sealing ring support member 17.

As shown in FIGS. 3, 5 and 12 through 14, the fastening ring support member 20 can include a first axial wall 80, a second axial wall 82 and a radially outer wall 83, wherein the fastening ring support member can be positioned within the fastening ring support compartment such that the radially outer wall 83 engages the second linear segment 135 of the inner wall 13 of the fitting, and such that the first axial wall 80 of the fastening ring support member 20 is in mating contact with the rear wall 73 of the fastening ring 18. In this way, the fastening ring base 70 is securely maintained between the first axial wall 80 of the fastening ring support member 20 and the axially outer wall 62 of the sealing ring support member 17. As further shown in FIGS. 12 through 14, the support member 20 includes a radially inner surface 86, a beveled back edge 85 extending from the second axial wall 82 to the inner surface 86, and an angled front edge 87 extending from the first axial wall 80 to the inner surface 86. The angled front edge 87 provides at least partial support to the back edges 165 of the fastening ring teeth 19 during operation.

Figure 18:
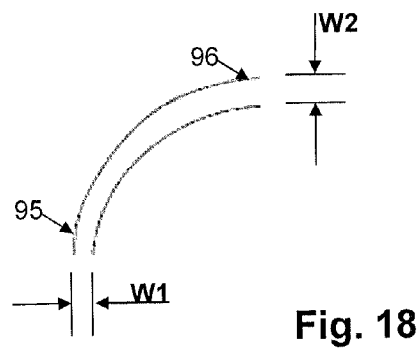
FIG. 18 is a detailed view of encircled portion 18-18 of FIG. 7.
Figure 9:
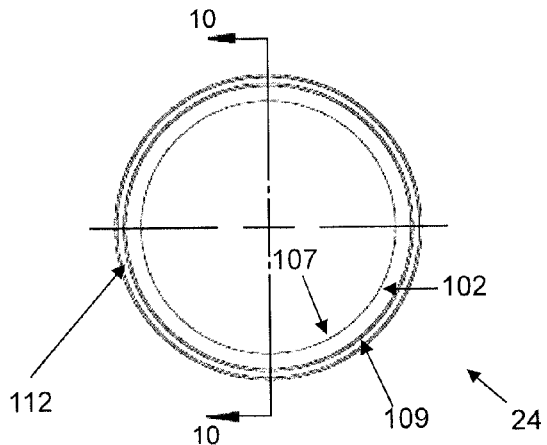
FIG. 9 is a front view of a retaining ring in accordance with embodiments of the present invention.
Figure 10:
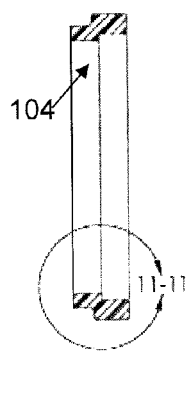
FIG. 10 is a right side cross-sectional view of the retaining ring taken along line 10-10 of FIG. 9.
Figure 11:
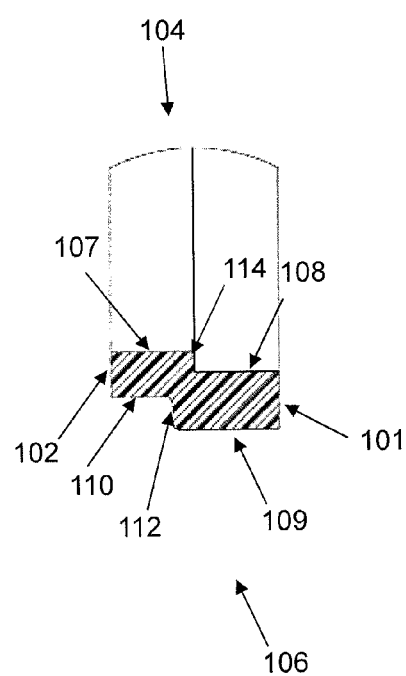
FIG. 11 is a detailed cross-sectional view of encircled portion 11-11 of FIG. 10.
Figure 12:
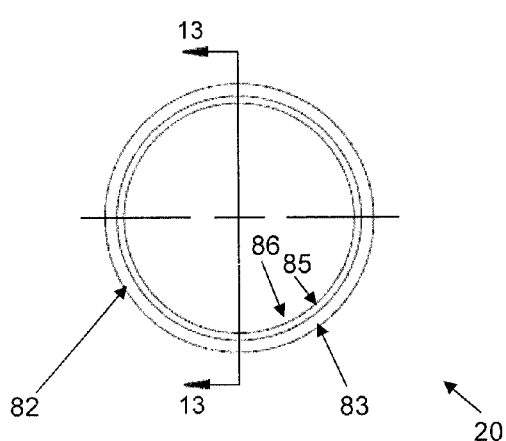
FIG. 12 is a front view of a fastening ring support member in accordance with embodiments of the present invention.
Figure 13:
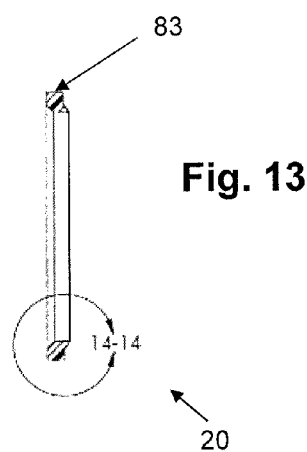
FIG. 13 is a right side cross-sectional view of the retaining ring taken along line 13-13 of FIG. 12.
Figure 14:
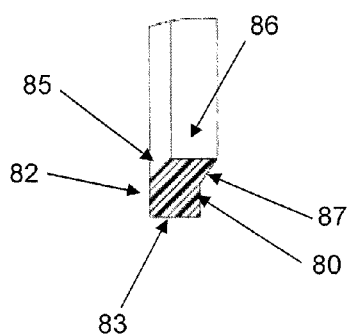
FIG. 14 is a detailed cross-sectional view of encircled portion 14-14 of FIG. 13.

As shown in FIGS. 1 through 8 and 18, the shield member 22 comprises a body having inner 90 and outer 92 faces, an inner edge surface 93 and an outer edge surface 94, wherein the inner edge surface 93 is substantially cylindrical, and the outer edge surface 94 is not cylindrical. In various embodiments, the outer edge surface 94 is formed with at least two parallel, diametrically opposed edge segments 95 and further is formed with at least two non-parallel, diametrically opposed edge segments 96. As shown in FIG. 18 each of the parallel edge segments 95 has a width W1, and each of the non-parallel edge segments 96 has a width W2, where W2 is greater than W1. In this way, the shield member 22 can slide through the opening 200 created by the back wall portion 132 of the retaining ring compartment 43 before the retaining ring 24 is snapped into place. The parallel edge segments 95 can be aligned with the interior edge 47 defining the fitting opening 200 so as to be insertable without coining Once inserted, the edge segments 96 of the shield member outer edge surface 94 are in mating contact with the first linear segment 133 of the retaining ring compartment 43, whereas the edge segments 95 are not. Further, a first portion 97 of the outer face 92 of the shield member is in mating contact with the front wall portion 130 of the retaining ring compartment 43, and a second portion 98 of the shield member outer edge surface 92 is not in mating contact with the retaining ring compartment, but is rather in contact with the second axial wall 82 of the fastening ring support member 20. In various embodiments, the inner face 90 of the shield member 22 is in mating contact with an axially external wall 102 of the retaining ring member 24, once the retaining ring member is installed.

As shown in FIGS. 1 through 5 and 9 through 11, the retaining ring member 24 has an axially internal wall 101, an axially external wall 102, a radially internal wall 104, and a radially external wall 106. In various embodiments, the axially external wall 102 extends from an overhang surface 110 to a ledge surface 107 of the radially internal wall 104. Further, a radially extending mid-wall 112 extends from the overhang surface 110 to a radially outer portion 109 of the radially external wall 106. A radially extending side wall 114 extends from the ledge surface 107 of the radially internal wall 104 to a platform surface 108 of the radially internal wall 104. As shown in FIG. 5, the radially outer portion 109 of the radially external wall 106 acts as guide for the outer surface 126 of the release pusher 26. Further, the mid-wall 112 acts as a retainer for the annular retaining edge 31 of the release pusher 26. The edge 31 can slide along the overhang surface 110 of the retaining ring member 24 when the release pusher 26 is pushed axially inwardly to engage the fastening ring teeth 19. The radially extending side wall 114 engages the back wall portion 132 of the inner wall 13 of the fitting 12, while the ledge surface 107 is in mating contact with the first linear segment 133 of the inner wall. Further, the axially external wall 102 engages the shield member 22 as described above.

Figure 15:
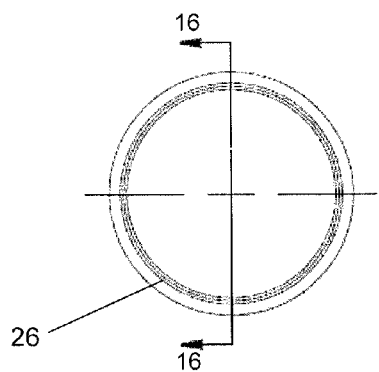
FIG. 15 is a front view of a release pusher member in accordance with embodiments of the present invention.
Figure 16:
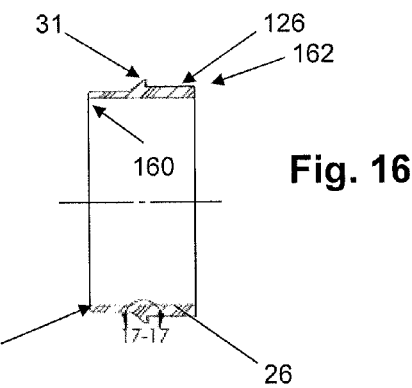
FIG. 16 is a right side cross-sectional view of the release pusher member taken along line 16-16 of FIG. 15.
Figure 17:
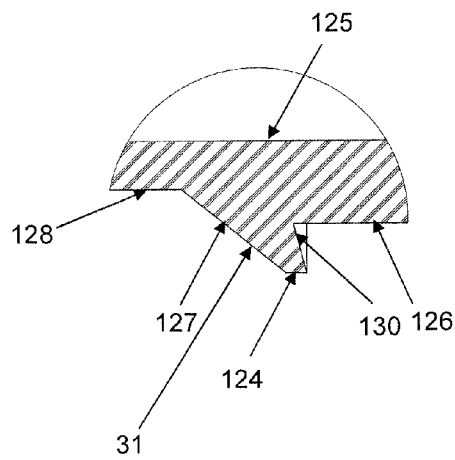
FIG. 17 is a detailed cross-sectional view of encircled portion 17-17 of FIG. 16.

As shown, for example, in FIGS. 15 through 17, the release pusher 26 is substantially cylindrical, includes an external tip 29 at the fastening ring engaging end 160 thereof, and further includes an annular retaining edge 31 extending radially outwardly of an outer wall 126, 128 of the release pusher 26. In various embodiments, the outer wall portion 128 that extends axially inwardly into the fitting 12 during operation can have an external radius that is smaller than the external radius of the outer wall portion 126 of the pusher, which facilitates the sliding contact between outer wall portion 128 and fastening ring support member 20, as well as the sliding contact between outer wall portion 126 and retaining ring member 24 during operation. As shown in FIG. 17, the release pusher retaining edge 31 can include a radial outer ledge 124, a front wall 127 and a back wall 130. Shield member 22 can be designed and positioned such that it does not contact outer wall portion 128 of the release pusher 26 during operation, so as to minimize any resisting force on the operation of the release pusher. However, it will be appreciated that in various embodiments, the shield member 22 inner edge 93 can extend to the outer wall 128 of the release pusher 26. In various embodiments, the release pusher 26 can comprise an injection-molded plastic material or a metal material such as brass, for example. When pressure is applied on the back side 162 of the release pusher 26, the external tip 29 can engage the inside surface 165 of the fastening ring teeth 19, and the edge back wall 130 can removeably engage a retaining lip 112 extending radially inwardly from the axially inner wall 110 of retaining ring 24, as shown in FIG. 5.

In various embodiments, the fastening ring 18 can be a split ring member or can be an integral member with no split. A split can facilitate insertion and/or removal, by allowing the diameter of the base 18 to be slightly reduced through pressure so that the fastening ring can be more readily manipulable. In further embodiments, the fastening ring support member can also be split. In various embodiments, the shield member 22 can be provided with teeth on the inner edge 93 thereof to act as a secondary fastening ring. Further, in various embodiments, the sealing ring support member 17 and/or the fastening ring support member 20 can be integrally formed into the inner wall 13 of the fitting, thereby becoming a unitary, monolithic structure with the fitting.

In operation, the fitting 12 of the present invention is provided and one or more sealing members (e.g., 14) are inserted into the sealing ring compartment 41. Next, in the embodiments with an independent sealing ring support member 17, this member 17 is inserted so as to extend into the sealing ring compartment adjacent the sealing ring 14. It will be appreciated that a portion of the sealing ring support member 17 will also lie in the fastening ring compartment 42, as described above, and shown, for example, in FIGS. 4 and 5. The fastening ring 18 is then inserted into the fastening ring support compartment 42, followed by the fastening ring support member 20. Next, the shield member 22 is inserted without any coining or threaded connection adjacent the fastening ring support member, and the retaining ring 24 is then inserted into the retaining ring compartment so as to abut the shield member 22 as described above. The release pusher 26 is then snapped into engagement with the inner surface 104 of the retaining ring member 24. When a pipe (not shown) is inserted, it travels through the release pusher 26 into the pipe receiving cavity 200 of the fitting 12, engaging the fastening ring 18 and the one or more sealing members 14. The sealing members provide a strong, leak-free seal and the fastening ring prohibits any inclination the pipe may have to slide out of position.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A push-to-connect joint assembly, comprising:
   a monolithically formed fitting having an interior wall and an exterior wall, wherein the interior wall defines a cavity extending axially through the fitting and includes a first interior wall portion comprising a plurality of recessed axially spaced apart compartments defining a sealing ring compartment, a fastening ring support compartment and a retaining ring compartment;
   a first sealing ring positioned within the sealing ring compartment;
   a sealing ring support member having an axially inner wall and an axially outer wall, wherein the sealing ring support member is positioned at least partially within the sealing ring compartment and at least partially within the fastening ring support compartment, wherein the sealing ring support member axially inner wall is adapted to be in mating contact with the first sealing ring;
   a fastening ring having a base portion, wherein the base portion has a front wall, a rear wall and a radially outer edge, wherein the base portion is positioned within the fastening ring support compartment and wherein the front wall is in mating contact with the axially outer wall of the sealing ring support member;
   a fastening ring support member having a first axial wall, a second axial wall and a radially outer wall, wherein the fastening ring support member is positioned within the fastening ring support compartment and wherein the first axial wall of the fastening ring support member is in mating contact with the rear wall of the fastening ring;
   a shield member having first and second faces, an inner edge surface and an outer edge surface, wherein the shield member is positioned within the retaining ring compartment and wherein the first face is in mating contact with the second axial wall of the fastening ring support member;
   a retaining ring member having an axially internal wall, an axially external wall, a radially internal wall, and a radially external wall, wherein the retaining ring member is positioned within the retaining ring compartment and wherein the axially internal wall of the retaining ring member is in mating contact with the second face of the shield member; and
   a release pusher member slidably engaged with the retaining ring member radially internal wall.

2. The assembly of claim 1, wherein the shield member second face has a first portion and a second portion, and wherein the first portion of the shield member second face is in mating contact with the retaining ring compartment, and the second portion of the shield member second face is in contact with the fastening ring support member.

3. The assembly of claim 1, wherein the shield member inner edge surface is substantially cylindrical, and the shield member outer edge surface has an inconsistent radial distance.

4. The assembly of claim 1, wherein the outer edge surface of the shield member has edge segments in mating contact with the retaining ring compartment, and further has edge segments that are not in mating contact with the retaining ring compartment.

5. The assembly of claim 4, wherein each of the edge segments that is not in mating contact with the retaining ring compartment has a width W1, and each of the edge segments that is in mating contact with the retaining ring compartment has a width W2, and further wherein W2 is greater than W1.

6. The assembly of claim 4 wherein the release pusher is positioned radially inwardly of the tube support member within the fitting.

7. The assembly of claim 6 further including a second sealing ring positioned within the sealing ring compartment.

8. The assembly of claim 7 wherein at least one of the retaining ring support member and the fastening ring is split.

9. The assembly of claim 1 wherein the release pusher member does not contact the fitting.

10. A method for assembling a push-to-connect joint assembly, comprising:
    forming a monolithic fitting having an interior wall and an exterior wall, wherein the interior wall defines a cavity extending axially through the fitting and includes a first interior wall portion comprising a plurality of recessed axially spaced apart compartments defining a sealing ring compartment, a fastening ring support compartment and a retaining ring compartment;
    inserting a first sealing ring positioned within the sealing ring compartment;
    inserting a sealing ring support member at least partially within the sealing ring compartment and at least partially within the fastening ring support compartment, wherein the sealing ring support member has an axially inner wall and an axially outer wall, and wherein the sealing ring support member axially inner wall is adapted to be in mating contact with the first sealing ring;

inserting a fastening ring having a base portion within the fastening ring support compartment, wherein the base portion has a front wall, a rear wall and a radially outer edge, and wherein the base portion is positioned within the fastening ring support compartment and wherein the front wall is in mating contact with the axially outer wall of the sealing ring support member;

positioning a fastening ring support member within the fastening ring support compartment, wherein the fastening ring support member has a first axial wall, a second axial wall and a radially outer wall, wherein the first axial wall of the fastening ring support member is in mating contact with the rear wall of the fastening ring;

positioning a retaining ring member within the retaining ring compartment, wherein the retaining ring member has an axially internal wall, an axially external wall, a radially internal wall, and a radially external wall, and wherein the axially internal wall of the retaining ring member is in mating contact with the second face of the shield member;

inserting a shield member having first and second faces, an inner edge surface and an outer edge surface within the retaining ring compartment axially between the fastening ring and the retaining ring member, wherein the first face is the axially outermost face of the shield member and is in mating contact with the second axial wall of the fastening ring support member, and wherein the axially internal wall of the retaining ring member is in mating contact with the first face of the shield member within the retaining ring compartment; and installing a release pusher member such that the release pusher member is slidably engaged with the retaining ring member radially internal wall.

* * * * *